Feb. 20, 1968
M. E. VIG
3,369,799
TRACTOR-MOUNTED CONCRETE MIXER
Filed March 29, 1967
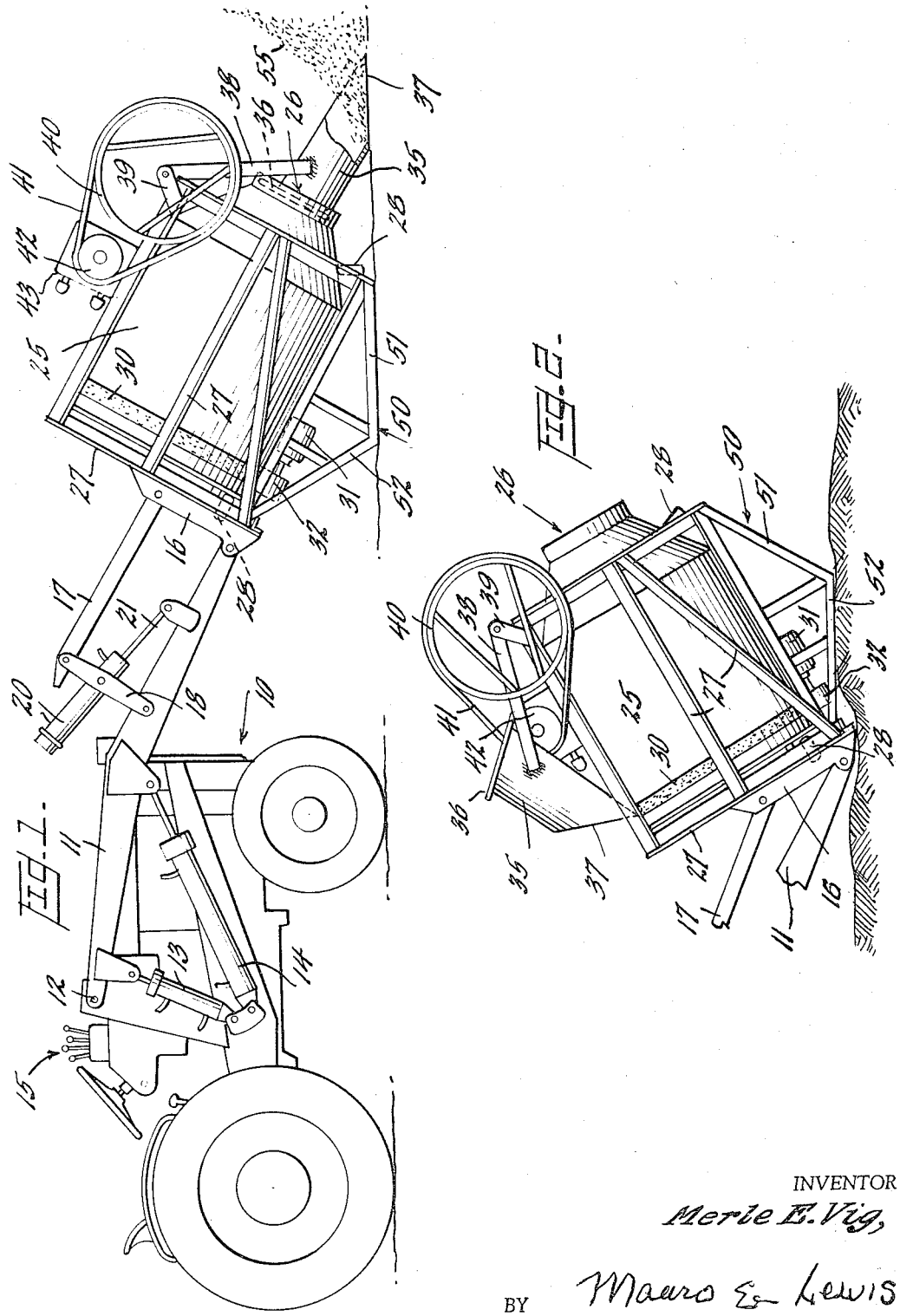
INVENTOR
*Merle E. Vig,*
BY *Mauro & Lewis,*
ATTORNEYS

United States Patent Office 3,369,799
Patented Feb. 20, 1968

3,369,799
TRACTOR-MOUNTED CONCRETE MIXER
Merle E. Vig, Mud Butte, S. Dak. 57758
Filed Mar. 29, 1967, Ser. No. 626,791
6 Claims. (Cl. 259—154)

ABSTRACT OF THE DISCLOSURE

This invention relates to improvements in a rotary concrete mixer adapted to be carried on a tractor of the type ordinarily equipped as a front end loader, where the mixer replaces the dirt scoop or the like. The improvements consist of modifications to the mixer, including a metering scoop and a loading skid, whereby the mixer can be motivated by the tractor to load the mixer with a known quantity of material and to adjust the position of the mixer while in ground contact for the addition of other materials into the mixer.

---

This invention relates to an improved concrete mixing, carrying, and pouring attachment for a tractor.

*Brief summary of the invention*

Certain makes of portable concrete mixers of relatively small size (as compared to truck mounted rotary mixers in common use) are known, which are mounted on power-operated arms at the front end of a tractor. These were essentially developed as modifications of tractor-type vehicles known as front end loaders, where the mixer is substituted for a scoop or shovel, and is connected for rotation by the power plant of the tractor. Such machines allow the mixer to be charged with mixing materials at ground level; the mixer may then be rotated while in transit to a construction site. There, the mixer may then be tilted for discharge of its contents or at an elevation (as into an elevated form for a wall or the like) or at ground level. An example of such known machines is found in the U.S. patent to Styes, No. 2,706,623.

The improvements of the present invention as applied to this type of machine first consist of a metering or measuring loading scoop of selected capacity, which in operative position fits over the mount of the mixer. This is attached by pivotal means and may be swung out of or into operative position by power means operated from the tractor.

When in operative position in advance of the mixer mouth, the metering scoop when adjusted to a proper angle, can be caused to scoop from the ground supply material such as sand, a known quantity thereof as defined by the capacity of the scoop. This is done simply by driving the scoop into said material by manipulating the tractor. The charge contained in the scoop is then transferred into the mixer by upwardly tilting the mixer and scoop. This loading process may obviously be repeated as desired, and also used for loading of the cement portion of a concrete mixture, if the cement is furnished in bulk form.

Co-operating with the metering scoop is a skid-like base member formed with two sections at "V" angles to each other, which member is connected to the base of the frame in which the mixer revolves, and which allows the mixer to assume one of two selected positions when brought into ground contact. In one such position, the mixer, with scoop attached, is supported by the skid at the proper downward angle to perform the scooping operation above described. In the other position, the mixer mouth is tilted upwardly. In this position, the scoop is emptied of its contents, and when the scoop opens or is pivoted away from the mixer mouth, the mixer is in position to receive other materials such as cement poured from bags, and water.

The skid or base member considerably assists the operator of the tractor in bringing the mixer into the two loading positions above described, and allows the mixer to be shoved along the ground over possible obstructions during the scooping operation.

Further details will be described in connection with the drawing, wherein:

FIG. 1 is a side elevation of a tractor-mounted mixer embodying the invention, shown in position for the scoop to pick up a load of material, such as sand, from the ground, and FIG. 2 is an elevation of the mixer portion shown in a different position, suitable for the introduction by hand of additional materials into the mixer, such as cement and water.

In these views, a tractor of conventional type as above described in indicated at 10, it being equipped with a source of hydraulic power (not shown) for driving the various elements described below. In these views, hydraulic lines leading to these elements have been omitted for the purpose of clarity.

A pair of arms 11 are pivoted to the tractor frame at 12 and extend forwardly of the vehicle. Arms 11 are employed to raise and lower the mixer carried on the ends of arms 11 by actuating the hydraulic cylinders 13–14 by means of one of the controls indicated generally at 15.

The tilting linkage for the mixer includes pivoting support arms 16 for the mixer frame, in turn pivotally coupled by the pairs of arms 17–18 in rectangular fashion to the arms 11. A pair of hydraulic cylinders 20 are pivoted midway of the arms 18 and their pistons 21 are pivoted to frame 11 midway of the linkage. Actuation of the cylinders 20 by one of the controls 15 adjusts the tilt of the support arms 16 and the mixer attached.

The rotary mixer 25, having a mount 26, is contained in an openwork frame 27, and is supported for rotation therein by idler rollers such as shown at 28. Frame 27 is connected at four pivot points to the support arms 16. Mixer 25 is driven by means of a friction band 30 placed around the body of the mixer. Frame 27 carries near its base a fluid motor 31 having a friction wheel 32 engaging friction band 30. Motor 31 is controlled by one of the controls 15.

The measuring scoop 35 forming part of the invention is trough-shaped in cross section and is formed with a ring-shaped exit mouth 36 proportioned to make suitable engagement with mouth 26 of the mixer 25 when in operative position. Scoop 35 is also formed with an angular portion 37 making flat ground contact in operative position as seen in FIG. 1.

Scoop 35 is pivotally mounted to the top of mixer frame 27 by the pivoted pairs of arms 38–39 arranged to allow scoop 35 to assume the operative position shown in FIG. 1, and the inoperative position shown in FIG. 2. The driving means for shifting the scoop 35 from one position to the other includes a pulley wheel 40 mounted on one of the arms 38 on the same axis as the pivot connection between arms 38–39. Rotation of pulley wheel 40 is provided by a chain 41 leading to the sprocket 42 of a fluid motor 43 attached to the frame 27 of the mixer. One of the controls 15 is connected to actuate wheel 40 and hence alter the position of the scoop 35.

Another feature of the invention is skid 50 having a V-shaped construction, mounted on the base of mixer frame 27. Skid 50 is formed with two portions 51–52 making one angle of rest such that when the mixer is resting on portion 51, the scoop 35 with its portion 37 is in flat ground contact, in position for loading a measure of material from a pile 55, as shown in FIG. 1.

When the mixer 25 is tilted so that frame 27 is resting with portion 52 in ground contact, the mouth of the mixer 25 then being relatively elevated, any content of scoop 35 will fall into the mixer. In the same position, but with scoop 35 retracted as seen in FIG. 2, additional materials such as cement and water may be manually added.

The loading of the scoop 35 in the FIG. 1 position is simply accomplished by actuating the tractor forward, thus thrusting scoop 35 into the pile of material 55.

What is claimed is:

1. In a tractor-mounted portable mixer of the type consisting of a tractor carrying a rotary mixer mounted for rotation in a frame carried by supporting means in extended position with respect to the tractor, and having power means for rotating, raising, lowering and tilting said mixer, the improvement consisting of a material-measuring scoop operationally mounted at the mouth of the mixer adapted to scoop material into said mixer by moving said mixer by said tractor.

2. The invention according to claim 1, with the further improvement consisting of a ground engaging skid mounted beneath the frame carrying the mixer, said skid being formed with one portion set at an angle holding the mixer at an angle with respect to the ground suitable for scooping said material, and being formed with another portion set at an angle holding the mixer at an angle with respect to the ground suitable for hand-loading of other material.

3. The invention according to claim 1, wherein the material-measuring scoop is pivotally mounted to the frame carrying the mixer in position to be swung into or out of operative position relative to the mixer mouth.

4. The invention according to claim 3, with the addition of power means for shifting said scoop.

5. The invention of claim 3, with the addition of power means controlled from the tractor for shifting said scoop.

6. The invention according to claim 1, wherein the material-measuring scoop has an angled front lip portion for making flat ground contact.

References Cited

UNITED STATES PATENTS

| | | | |
|---|---|---|---|
| 2,594,904 | 4/1952 | Frohring | 259—177 |
| 2,656,164 | 10/1953 | Knowlton | 259—177 X |
| 2,706,623 | 4/1955 | Styes | 259—161 |

ROBERT W. JENKINS, *Primary Examiner.*